Sept. 21, 1926.  G. SHERMAN  1,600,741
PAN LINER
Filed July 20, 1925
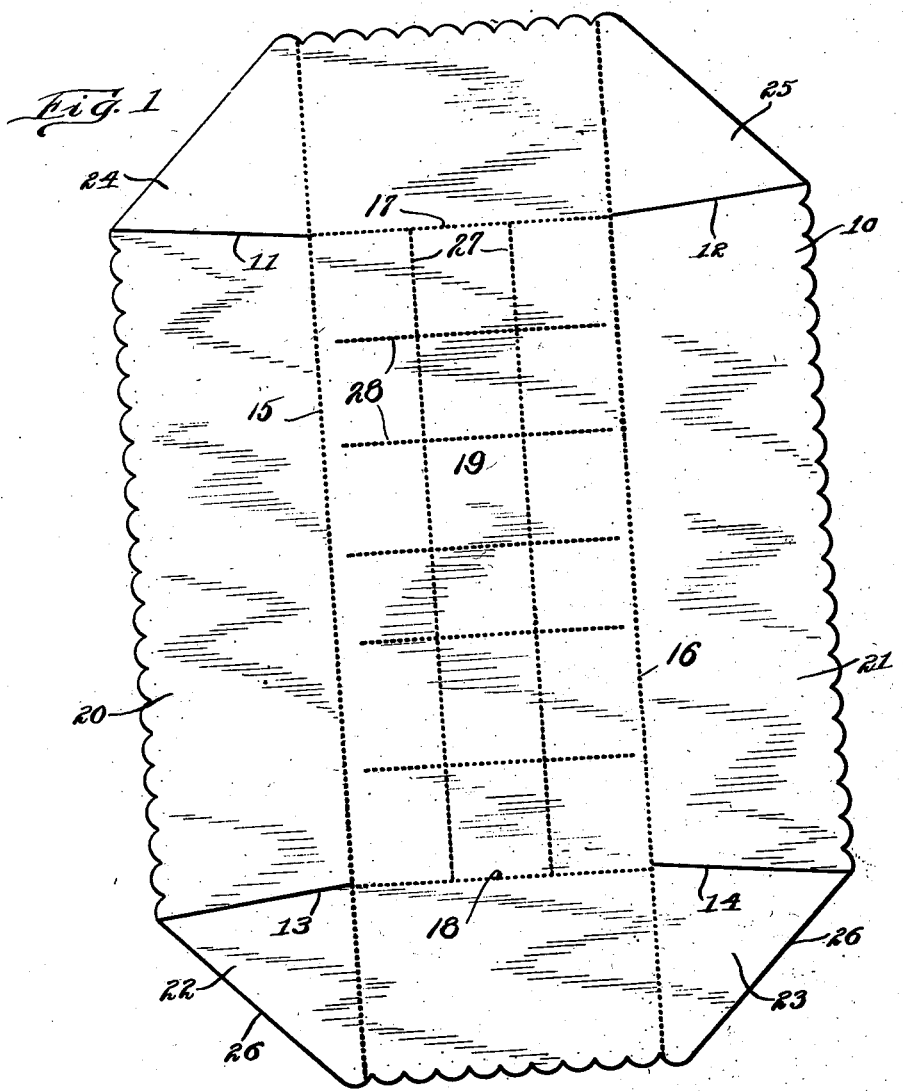
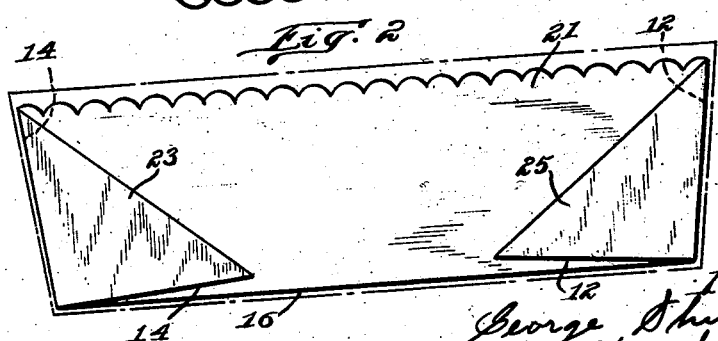

Patented Sept. 21, 1926.

1,600,741

UNITED STATES PATENT OFFICE.

GEORGE SHERMAN, OF BRIGHTON, MASSACHUSETTS.

PAN LINER.

Application filed July 20, 1925. Serial No. 44,740.

This invention relates to paper liners for pans, trays, tins, and the like, and particularly to liners employed in cake pans during the baking operation.

In the baking of cakes, it is generally necessary, in order to obtain a satisfactory product, to grease the pan in which the cake is baked so as to prevent its caking onto and adhering to the pan or tray, when baked. This, obviously, involves the handling of greasy materials and utensils which are not only unsanitary, but also very difficult to clean. Aside from that, when the cake is baked, any handling thereof will result in causing the hands to become greasy and uncomfortable due to the grease which was absorbed by the batter during the baking operation. I propose to do away with this unpleasantness by interposing between the batter and the pan a liner comprising a layer of sheet material, and thus make it unnecessary to use grease and suffer the unpleasantness incidental thereto.

Liners of this kind have heretofore been made and more or less shaped and preformed to fit the interior of the pan or tray, but I have found that in order to produce a cake which is both satisfactory in quality and attractive to the eye, it is necessary to provide a liner which will snugly fit the bottom and sides of the pan or tray just as a film or layer of grease itself would. To this end, it is an object of my invention to provide a liner having an inherent capability of adapting itself to the bottom and sides of the pan to best advantage.

A further object of the invention resides in the provision of a plurality of openings or perforations in the liners through which heat may pass, thus permitting a gradual and constant application of heat to the batter. This not only insures an even change in temperature throughout the batter, but also makes possible a uniform heating on all sides thereof, and as a consequence, the finished product does not sag in the manner well known to bakers at present. On the contrary, because of the uniform and even distribution of heat permitted by my invention, the gases formed and generated during the baking process seep through the batter and thereby "swell up" the cake, causing it to acquire a much greater volume than is customarily obtained.

With the above in view, I produce the liner-blank of a dimension and outline adapted to approximate the interior area of the bottom and sides of the pan or other container, and provide a co-operative arrangement of perforations or score lines so arranged as to pre-dispose the liner for conforming most readily to the shape of the pan, with additional base perforations for the purpose above named. The foregoing and other objects and advantages of the invention will more fully appear from the following detailed description taken in connection with the accompanying drawings, and the distinctive features of novelty will be pointed out in the appended claims.

Referring to the drawings:

Fig. 1 is a plan view of a liner produced in accordance with the invention; and

Fig. 2 is a side view of the liner folded in place in a pan or tray, the pan being shown in dotted lines.

The liner of my invention is produced of a blank 10 of suitably selected paper or like material. It is slitted inwardly from its opposite sides adjacent its respective ends as indicated at 11, 12, 13, 14 along lines conforming approximately to the corners of the pan when the liner is fitted therein. The liner blank is also creased, scored, perforated, or similarly pre-disposed for folding along lines 15, 16, 17, 18 which define the bottom portion 19 which corresponds in dimension to, and is adapted to fit the bottom of, the pan, tray or the like for which the liner is intended. These folded lines of the liner are preferably characterized by slits or perforations at intervals therethrough. This is a feature of advantage not only in further pre-disposing the liner for bending along these lines, but also in permitting excessive heat to escape and to distribute itself properly through the pan and batter,—and this in turn causing the shortening to be well distributed through the entire cake, since there is a great tendency for the shortening to remain at the bottom of the cake if there is no outlet for the heat to escape, and the result is that the bottom of the cake is very greasy and the top is very dry and crusty since the shortening had not had opportunity to become well distributed throughout the cake. This objection is obviated by the provision of the perforations of the present liner.

By further providing a series of perforations along the horizontal lines 27 and transverse lines 28 in the bottom portion 19, excessive heat is permitted to escape more readily from the cake, and it is also found that air bubbles, customarily found within the cake batter as it is poured into the lined pan, and gases formed and generated during the baking operation, are dissipated through the perforations, assuring a homogeneous content within the baked cake. Since the heat of the pan will be gradually communicated to the cake batter through these perforations, the baking proceeds evenly with my improved liner; whereas, if an imperforated liner is employed, it is found that the batter remains relatively cool until the liner is heated to the comparatively intense heat of the pan, when the heat is then suddenly conveyed to the batter, causing an uneven baking process. Furthermore, by providing such perforations whereby the heat is permitted to distribute itself evenly throughout the batter, the bottom thereof is baked at substantially the same rate as the top, since it has direct contact with the heat rising through the perforations. This gives a uniformly baked product in contrast with the one obtained by using the liners employed at present which, because they lack these perforations, must necessarily delay the rate of baking at the bottom while allowing a greater rate of baking at the top due to direct contact with the heat there.

As the liner is put in place in a pan, the sides 20, 21 adapt themselves to the sides of the pan, folding upward along the pre-disposed folding lines 15, 16, while the ends of the liner likewise fold upward along the indicated lines of folding 17, 18. The facility with which the liner may be thus fitted to the pan is also enhanced by the provision of the perforations, or score lines, since the usual resistant air cushion occurring upon insertion of a closely fitting liner is dissipated through the perforations. The crease lines 15, 16 extend beyond their intersection with the lines 17, 18 to the respective ends of the liner, thus defining corner flaps 22, 23, 24, 25 which are adapted to fold upward in overlapping relation with respect to the sides 20, 21. These corner flap portions are preferably beveled off as indicated at 26 since the outer corners thereof would be of no use because they overlap the sides 20, 21 when the liner is folded into the pan. Thus by combining the feature of pre-disposed lines of folding constituted by the crease lines described, in conjunction with the slits 11, 12, 13, 14, the liner is capable of instantly and easily adapting itself to the interior walls of the pan without requiring any special manipulation or attention for fitting in place.

A liner constructed in accordance with my invention is simple and inexpensive of manufacture, yet its use is conducive to an appreciable saving of time and effort in conforming the liner to the pan. The corner flaps, 22, 23, 24, 25 serve to prevent the batter from seeping out of the liner and adhering to the cake pan; but it is obvious that the flaps may, if desired, be connected to the side portions 20, 21 rather than to the end portions of the liner, without impairing their utility in this respect. In such case, it is preferred that the perforations extend at slightly acute or obtuse angles, as the case may be, as indicated by the direction of the slits 11, 12, 13, 14, in order that the liner may closely fit within the diverging sides of the pan, illustrated in Fig. 2.

I am also aware that the invention may be embodied in other specific forms without departing from the spirit or essential attributes thereof, and I therefore desire the present embodiment to be considered in all respects as illustrative and not restrictive, particularly with respect to the arrangement of the perforations in the bottom portion 19, which may be distributed in any desired manner, reference being had to the appended claims rather than to the foregoing description to indicate the scope of the invention.

Having described my invention, what I claim as new and desire to secure by Letters Patent is:

1. A liner for baking pans comprising a blank of sheet material having weakened fold lines whereby said sheet may be folded to provide a bottom portion and an upstanding portion, said fold lines and bottom portion having perforations therein to permit the passage of heat therethrough during baking.

2. A liner for baking pans comprising a blank of sheet material having longitudinal weakened fold lines adjacent one pair of opposite edges defining side portions, and transverse weakened fold lines adjacent another pair of opposite edges defining end portions and, together with said longitudinal fold lines, defining also a bottom portion, said bottom portion and fold lines being perforated to permit the passage of heat therethrough during baking.

3. A pan liner of sheet material comprising a blank having longitudinal and transverse weakened fold lines defining bottom, side, and end portions of the liner of substantially the same dimensions as the corresponding portions of the pan into which said liner is placed, thereby adapting the liner to fit nicely within the pan, said bottom portion having a plurality of perforations therein to permit the passage of heat therethrough during baking.

4. A liner for baking pans comprising a blank sheet of material having longitudinal and transverse lines of perforations thereon defining bottom, side, and end portions of the liner of substantially the same size and dimensions as the corresponding portions of the pan into which said liner is placed, thereby enabling the liner to nicely and snugly fit within the pan, said bottom portion having a plurality of perforations therein which, together with said first named lines of perforations, permit the passage of heat through the liner during baking.

5. A liner for baking pans comprising a blank of sheet material having weakened fold lines whereby said sheet may be folded to provide a bottom portion and an upstanding portion, said upstanding portion being imperforate, and said fold lines and bottom portion having perforations therein to permit the passage of heat therethrough during baking.

6. A pan liner of sheet material comprising a blank having longitudinal and transverse weakened fold lines defining bottom, side, and end portions of the liner of substantially the same dimensions as the corresponding portions of the pan into which said liner is placed, thereby adapting the liner to fit nicely within the pan, said side and end portions being imperforate, and said bottom portion having a plurality of perforations therein to permit the passage of heat therethrough during baking.

In testimony whereof I affix my signature.

GEORGE SHERMAN.